Oct. 25, 1960  D. L. GARMAISE ET AL  2,957,917
RESOLUTION OF ORGANIC COMPOUNDS AND APPARATUS THEREFOR
Filed Oct. 19, 1956
RESOLUTION APPARATUS
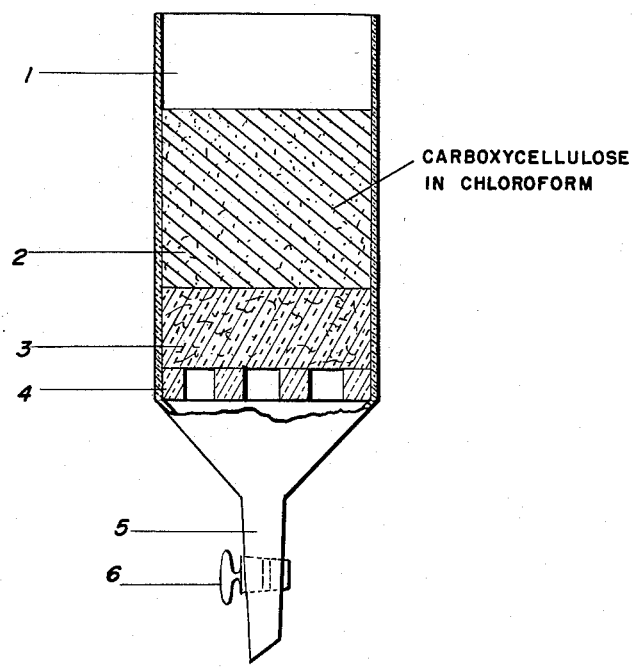
INVENTOR.
D.L. GARMAISE
JOSEPH COLUCCI
BY
J.D. KENNEDY

# United States Patent Office 2,957,917
Patented Oct. 25, 1960

2,957,917
RESOLUTION OF ORGANIC COMPOUNDS AND APPARATUS THEREFOR

David Lyon Garmaise and Joseph Colucci, Montreal, Quebec, Canada, assignors to Monsanto Chemical Company, St. Louis, Mo., a corporation of Delaware Filed Oct. 19, 1956, Ser. No. 617,106

6 Claims. (Cl. 260—583)

The present invention is directed to the resolution of racemates of organic compounds, particularly to the resolution of organic amine racemates, by a process involving adsorption of the organic compound on a carboxy cellulose material, followed by desorption of the organic compund from the carboxy cellulose material.

The invention is further directed to the resolution of racemates of asymmetric aliphatic amines of 1 to 8 carbon atoms by a process comprising placing the aliphatic amine racemate on a carboxy cellulose column by the addition of the aliphatic amine racemate dissolved in a suitable solvent to the column, then eluting the aliphatic amine from the column by use of a solvent.

In another aspect, the invention is directed to a column of a carboxy cellulose slurried with chloroform and supported by suitable means, as such a column is particularly suited to the resolution of organic racemates.

The accompanying drawing is an illustration of a simple embodiment of the resolution apparatus of the present invention. The drawing is a cross-section view which shows glass cylinder 1 containing a slurry 2 of carboxycellulose in chloroform, supported by a plug of glass wool 3, and a perforated porcelain filter disc 4; the glass cylinder is attached to take-off tube 5, which is provided with a stop-cock valve 6 for controlling the flow of liquids therethrough. The solutions of racemates to be resolved, and the eluting solvents are poured into the top of the cylinder 1, and the gravity flow of the liquids through the apparatus can be controlled, if desired, by means of valve 6. Of course, as will be apparent to those skilled in the art, many different types of supporting means can be used with the column of carboxy cellulose slurried in chloroform.

An object of the present invention is to provide a method of resolving the racemates of asymmetric aliphatic amines into their separate optical enantiomorphs. In many cases, it is desirable to obtain the isolated optical enantiomorph of an asymmetric compound, e.g., if the compound is to be used as an intermediate for the synthesis of optically active compounds, or if the compound is desired for nutritional purposes. A further object of the present invention is to provide a method of resolving racemates of asymmetric aliphatic amines which is adaptable to continuous production and which does not require numerous crystallization steps or other tedious and laborious procedures.

The common prior art procedure for the resolution of racemic mixtures involves the formation and crystallization of diasterioisometric compounds, followed by regeneration of the original compound in its optically active form; this procedure is obviously time-consuming and expensive. In the past some attempts have also been made to resolve racemic mixtures by adsorption on and desorption from optically active compounds or certain ion exchange resins; while some of these attempts resulted in partial resolution, the procedures were not very successful, as the degree of resolution was so small as to be of little practical significance.

It has now been discovered that it is possible to resolve racemates of asymmetric aliphatic amines with a high degree of resolution by the procedures of the present invention utilizing a carboxy cellulose column. Moreover, in the procedure of the present invention it is possible to use fairly low ratios of carboxy cellulose material to amino acid racemate to be resolved, e.g., in some cases it may be possible to use a carboxy column equivalent in exchange capacity to the equivalents of aliphatic amine racemate to be resolved; this may be of the order of 2 parts carboxy cellulose to 1 part of racemate. It will seldom, if ever, be necessary to use more than 500 to 1000 parts of carboxy cellulose per part of aliphatic amine racemate. By contrast, prior art procedures with other racemates and other adsorbents utilize 4,500 to 200,000 parts of adsorbent per part of racemate.

The following example is illustrative of the present invention, but the invention is not limited to the embodiment disclosed in the example.

EXAMPLE

A toluene slurry was prepared from 20 grams of carboxycellulose (280 milliequivalents) in powder form. The slurry was placed in a glass tube of 15 mm. inside diameter containing a glass wool plug near its lower end; a carboxycellulose column 38 cm. in length resulted. Chloroform was run through the column to replace the toluene. A solution of 5.5 grams of D,L-1,2-diaminopropane (150 milliequivalents) was added to the column. The column was then washed with chloroform until the eluate gave a test for base (60 ml. chloroform having been used). The eluate was then collected in 3 ml. fractions, and polarimetric readings were taken, as recorded in the table below:

Table

| Fraction No. | Weight, 1,2-Diaminopropane (mg.) | Concentration, 1,2-Diaminopropane (mg./cc.) | $\alpha$ | $(\alpha)_D^{25}$ |
| --- | --- | --- | --- | --- |
| 1 | 15.87 | 5.29 | $-0.004 \pm 2$ | $-1 \pm 1$ |
| 2 | 37.05 | 12.35 | $-0.001 \pm 1$ | $-1 \pm 1$ |
| 3 | 36.66 | 12.22 | $-0.001 \pm 1$ | $-1 \pm 1$ |
| 4 | 36.66 | 12.22 | $-0.030 \pm 1$ | $-5 \pm 1$ |
| 5 | 20.64 | 6.88 | $-0.021 \pm 2$ | $-6 \pm 1$ |
| 6 | 10.08 | 3.36 | $-0.011 \pm 1$ | $-6 \pm 1$ |
| 7* | 12.60 | 4.20 | $-0.013 \pm 1$ | $-6 \pm 1$ |
| 8 | 9.81 | 3.27 | $-0.015 \pm 1$ | $-9 \pm 1$ |
| 9 | 6.54 | 2.18 | $-0.017 \pm 1$ | $-11 \pm 1$ |
| 10 | 6.54 | 2.18 | $-0.011 \pm 1$ | $-10 \pm 1$ |
| 11 | 5.28 | 1.76 | $-0.004 \pm 1$ | $-4 \pm 1$ |

*Standing 17 hours after fraction No. 6 was collected.

In the table $\alpha$ is the observed rotation as measured on the stated concentration of the eluate in chloroform, and $$(\alpha)_D^{25} = \frac{100\alpha}{lc}$$

in which $l$ is the length of the polarimeter tube in decimeters and $c$ is the concentration in grams per 100 cc. of solution.

From the results above, it can be seen that substantial resolution has been achieved, although only a small amount of solvent has been passed through the column. As will be apparent to those skilled in the art, further elution with chloroform will elute additional amounts of 1,2-diaminopropane, and at a certain stage in the procedure, the dextrorotatory isomer rather than the levorotatory isomer will be separated. By continuing the above elution and then by repeating the elution procedure, it will be possible to obtain a high degree of resolution, i.e., to separate a large portion of the 1,2-diaminopropane racemate into its optical enantiomorphs, and to obtain optical enantiomorphs of high purity.

The carboxycellulose used in the above procedure was oxidized cellulose (Eastman Kodak) obtained by oxidizing the primary hydroxyl of cellulose with oxides of nitrogen ($NO_2$ and $N_2O_4$); it is reported to have 16–22% carboxy content. Its exchange capacity with respect to sodium acetate was determined to be 14 milliequivalents per gram of carboxycellulose.

Upon attempting to repeat the above resolution procedure with toluene as solvent, no base was detected in the eluate, and no rotation was observed.

In place of the carboxycellulose in the example, other oxidized celluloses, containing, for example, about 10 to 25% carboxyl content by weight can be utilized. In place of oxidized cellulose, carboxymethylcellulose, carboxyethylcellulose, etc., and other carboxyl derivatives of cellulose which can be designated as carboxy celluloses can be used in the resolution procedure. The carboxy celluloses for use in the resolution of aliphatic amine racemates can have carboxyl contents of from about 10% to about 40% by weight.

The carboxy cellulose for use in resolution procedures is ground to a degree of fineness suitable for permitting solutions to pass through it at a substantial rate. The carboxy cellulose is then formed into a train or column, supported by suitable means, and containing a substantial amount of chloroform, e.g., the carboxy cellulose can be slurried with chloroform and poured into a glass cylinder, and the resulting column will contain substantial amounts of chloroform as "hold-up." The presence of the chloroform appears to have an influence on the proper adsorption and desorption of the asymmetric aliphatic amine to obtain resolution.

By adsorption and desorption from a carboxy cellulose, many aliphatic amino compound racemates can be resolved. Thus, asymmetric diamino alkanes of 1 to 8 carbon atoms can be resolved on carboxy celluloses, e.g., 1,2-diaminopropane, 1,2-diaminobutane, 1,2-diaminopentane, 1,3-diaminobutane, 1,3-diaminohexane, 1,4-diaminoheptane, 1,7-diaminooctane, etc. In general it is desirable that the asymmetric amino compound have at least two functional groups, i.e., an amino group and in addition a hydroxyl group, carboxyl group, etc., or another amino group; of course, the amino compound can have three or more such functional groups. The α-amino acids are a group of asymmetric amino compounds which are of particular interest in regard to resolution procedures. Such α-amino acid racemates as the racemates of lysine, methionine, glutamic acid, valine, leucine, norleucine, isoleucine, threonine, methionine, etc., are amenable to resolution on carboxy cellulose columns as taught herein. Of course, in some cases it may be necessary to make adjustments in solvents and resolution conditions for the individual amino acids, as will be understood by those skilled in the art.

In addition to the aliphatic amines, it will also be possible to achieve resolution of other organic racemates on carboxy cellulose columns, e.g., amino compounds containing aromatic rings, or heterocyclic rings, or such amino acids as tryptophan, proline, and hydroxyproline.

The various aliphatic amino compound racemates can be resolved in their free acid form, or in the form of their acid salts, alkyl esters (if the amino compound is an amino acid), etc. Various acid salts can be used, e.g., hydrochloric acid salts, nitric acid salts, acetic acid salts, and other mineral and organic acid salts, etc. When the aliphatic amine racemate in the form of a salt is resolved, the resulting optical enantiomorphs can be converted to the corresponding free aliphatic amines.

In addition to chloroform, other solvents can be used in the resolution procedures of the present invention. However, the solvents have an important influence on the results attained. The desirability of a particular solvent for the resolution of a particular aliphatic amine racemate is related to the polarity of the solvent, and its solvation properties in regard to the aliphatic amine. Chloroform appears to be admirably suited for use in the resolution of a large number of aliphatic amino compounds on carboxy cellulose columns. For the elution procedure it is often desirable to use a solvent in which the aliphatic amino compound is sparingly soluble; the best resolution is often attained when the solubility and flow rate through the carboxy cellulose are such that the eluate contains less than 5 mg. of amino compound per cc. However, in practical use it may sometimes be advantageous to obtain eluates with up to 15 mg., or even up to 100 mg. or more of amino compound per cc. It will be possible to use one or more solvents for the addition of the racemate to the carboxy cellulose column, and one or more different solvents for the elution procedure. However, to obtain uniform results it is usually desirable that the same solvent be used throughout the resolution procedure and that this solvent be the same as the solvent which is present in the carboxy cellulose column when the aliphatic amine racemate is added to the column. When using mixtures of solvents it is sometimes advisable to use solvents of diverse properties, e.g., methanol can be used to modify the solvation properties of chloroform.

The flow rates through the carboxy cellulose column can vary for example, from about 10 to about 75 or more milliliters per hour per 100 grams of carboxy cellulose; about 25 ml. per hour is usually satisfactory.

As will be apparent to those skilled in the art, it will be possible to make numerous variations in the procedures set forth above by way of example. For instance, the flow rate of the solution can be controlled or varied by use of various valves, by use of positive pressure of gases, by use of vacuum, by the use of pumps at any suitable locations in the system, by the use of filter aids or other materials to increase flow rates, by varying the degree or fineness of the carboxy cellulose particles, or by many other means in place of a simple gravity flow system. Filter aids are often useful in maintaining flow rates, as the carboxy celluloses have a tendency to become packed during use. In place of the simple apparatus illustrated in the drawing, many other types of apparatus containing various refinements, multiple units, means for recycling, etc. can be used. For example, several carboxy cellulose columns of the illustrated type can be connected in series, or in parallel, or the illustrated type can be provided with take-offs at various positions along the length of the carboxy cellulose column. It will also be possible to alternately but continuously charge and elute a carboxy cellulose column with solutions of an organic amine, and eluting solvents, respectively. It is contemplated that all variations and refinements of the presently disclosed procedures and apparatus are within the purview of the present invention.

The resolution procedure of the present invention is ordinarily conducted at room temperature; however, other temperatures, e.g., from 0° C. to 80° C., can be used, and, in some cases it will be advantageous to use temperatures higher or lower than room temperature.

A method of resolving organic amine racemates by adsorption on and desorption from carboxy cellulose has been described; the method is adaptable to continuous production. A preferred resolution apparatus comprising a suitably supported slurry of a carboxy cellulose in chloroform has also been described.

We claim:

1. The resolution of racemates of aliphatic amines of no more than eight carbon atoms selected from the group consisting of α-amino acids which are saturated hydrocarbon except for —$NH_2$ and —COOH groups, and asymmetric diamino alkanes which are saturated hydrocarbon except for the amino groups, by a process which comprises adding the said amines dissolved in chloroform to a column of carboxycellulose having from 10 to 40% by weight carboxyl content, eluting with chloroform, and separately collecting fractions of eluate containing varying ratios of the D— and L— forms of said amines.

2. The method of claim 1 in which the carboxy cellulose is oxidized cellulose having about 16 to 22% carboxy content.

3. The method of claim 1 in which the carboxy cellulose is carboxymethylcellulose.

4. The method of claim 1 in which the carboxy cellulose is carboxyethylcellulose.

5. The method of resolving D,L-1,2-diaminopropane which comprises adding the said compound dissolved in chloroform to a column of carboxycellulose having a carboxy content of about 16 to about 22% by weight, eluting with chloroform, and separately collecting fractions of the eluate containing varying ratios of D- and L- forms of the 1,2-diaminopropane.

6. The process of claim 1 in which no more than 1000 parts by weight of carboxy cellulose are employed per part by weight of aliphatic amine.

References Cited in the file of this patent

UNITED STATES PATENTS

| | | |
|---|---|---|
| 2,203,009 | Calcott et al. | June 4, 1940 |
| 2,206,249 | Daimler et al. | July 2, 1940 |
| 2,529,398 | Krieck | Nov. 7, 1950 |
| 2,605,901 | Morrison et al. | Aug. 5, 1952 |
| 2,838,521 | Lunsford | June 10, 1958 |
| 2,851,463 | Hinman et al. | Sept. 9, 1958 |
| 2,881,217 | Doss et al. | Apr. 7, 1959 |

OTHER REFERENCES

Fujisawa: Chemical Abstracts, p. 13550, vol. 48 (1954).

Nakamura: Chemical Abstracts, p. 5916h, vol. 47 (1953).

Schramm et al.: Ber., vol. 77B, pp. 417–426 (1944).

Sakan et al.: Chemical Abstracts, vol. 46 (1952), p. 7075h.